US012468750B2

(12) United States Patent
Docherty et al.

(10) Patent No.: US 12,468,750 B2
(45) Date of Patent: Nov. 11, 2025

(54) COMPUTER-IMPLEMENTED METHOD FOR DETERMINING CONTENT FOR A CONTENT DISTRIBUTION SYSTEM

(71) Applicant: ThinkAnalytics Ltd., Glasgow (GB)

(72) Inventors: Peter Docherty, Glasgow (GB);
Christopher McGuire, Glasgow (GB);
Richard Dowling, Glasgow (GB);
Bryan Bossard, Canyon Country, CA (US)

(73) Assignee: ThinkAnalytics Ltd., Glasgow (GB)

( * ) Notice: Subject to any disclaimer, the term of this patent is extended or adjusted under 35 U.S.C. 154(b) by 17 days.

(21) Appl. No.: 18/129,728

(22) Filed: Mar. 31, 2023

(65) Prior Publication Data

US 2024/0330353 A1 Oct. 3, 2024

(51) Int. Cl.
| | | |
|---|---|---|
| *G06F 16/00* | (2019.01) | |
| *G06F 16/2457* | (2019.01) | |
| *G06F 16/435* | (2019.01) | |
| *G06F 16/45* | (2019.01) | |
| *G06F 16/48* | (2019.01) | |
| *H04N 21/442* | (2011.01) | |
| *H04N 21/466* | (2011.01) | |

(52) U.S. Cl.
CPC ...... *G06F 16/435* (2019.01); *G06F 16/24578* (2019.01); *G06F 16/45* (2019.01); *G06F 16/48* (2019.01); *H04N 21/44204* (2013.01); *H04N 21/4667* (2013.01)

(58) Field of Classification Search
CPC .. G06F 16/435; G06F 16/24578; G06F 16/45; G06F 16/48; H04N 21/44204; H04N 21/4667
See application file for complete search history.

(56) References Cited

U.S. PATENT DOCUMENTS

| | | |
|---|---|---|
| 6,567,814 B1 | 5/2003 | Bankier et al. |
| 7,805,129 B1 | 9/2010 | Issa et al. |
| 9,699,491 B1 | 7/2017 | Docherty et al. |
| 9,756,390 B1 | 9/2017 | Docherty et al. |
| 9,906,837 B1 | 2/2018 | Docherty et al. |
| 9,973,797 B1 | 5/2018 | Docherty et al. |
| 10,091,555 B1 | 10/2018 | Docherty et al. |
| 10,289,739 B1 | 5/2019 | Docherty et al. |
| 10,356,035 B1 | 7/2019 | Gravino et al. |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Paul Kim
(74) *Attorney, Agent, or Firm* — Foley & Lardner LLP

(57) ABSTRACT

A computer-implemented method for determining desirable content for a content distribution system is disclosed. The method comprises: for each of a plurality of user devices, monitoring user activity including identifying content that the user of the user device has interacted with; obtaining metadata concerning the identified items of content, the metadata representing at least some properties of the identified items of content; aggregating the metadata for a plurality of users; using the aggregated metadata to identify one or more items or combinations of metadata popular with the plurality of users; and using the identified metadata to determine desirable content.

18 Claims, 8 Drawing Sheets

(56) References Cited

U.S. PATENT DOCUMENTS

| | | |
|---|---|---|
| 10,412,454 B2 | 9/2019 | Docherty et al. |
| 11,212,584 B2 | 12/2021 | Docherty et al. |
| 11,343,573 B2 | 5/2022 | Docherty et al. |
| 2003/0106064 A1 | 6/2003 | Plourde |
| 2007/0157222 A1 | 7/2007 | Cordray et al. |
| 2008/0304812 A1 | 12/2008 | Jin |
| 2010/0005492 A1 | 1/2010 | Takano et al. |
| 2010/0070507 A1 | 3/2010 | Mori |
| 2011/0243529 A1 | 10/2011 | Oryoji et al. |
| 2014/0149344 A1 | 5/2014 | Pudipeddi et al. |
| 2014/0279756 A1 | 9/2014 | Whitman |
| 2015/0082330 A1 | 3/2015 | Yun et al. |
| 2015/0100987 A1 | 4/2015 | Whitman et al. |
| 2015/0269488 A1* | 9/2015 | Galai .................. G06Q 30/02 706/11 |
| 2017/0311015 A1 | 10/2017 | Docherty et al. |
| 2020/0252690 A1 | 8/2020 | Docherty et al. |
| 2021/0034657 A1* | 2/2021 | Kale .................. G06V 20/35 |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |
| WO | WO-2013/186061 A1 | 12/2013 |

* cited by examiner

Table 1    learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Figure 2

COMPUTER-IMPLEMENTED METHOD FOR DETERMINING CONTENT FOR A CONTENT DISTRIBUTION SYSTEM

FIELD OF THE INVENTION

The present invention relates to a computer-implemented method for determining content for a content distribution system.

BACKGROUND OF THE INVENTION

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic program guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers. It has been suggested to provide viewers with content recommendations, which may lead them more rapidly to content that may be of interest.

Personal video recorders have the capability of recording and storing content items from live linear television broadcasts and downloading and storing content items from video on demand services. As such, the content items stored on such devices provide a content source that is unique to the owner of the personal video recorder.

SUMMARY

In a first aspect of the invention, there is provided a computer-implemented method for determining desirable content for a content distribution system, comprising:
  for each of a plurality of user devices, monitoring user activity including identifying content that the user of the user device has interacted with;
  obtaining metadata concerning the identified items of content, the metadata representing at least some properties of the identified items of content;
  aggregating the metadata for a plurality of users;
  using the aggregated metadata to identify one or more items or combinations of metadata popular with the plurality of users; and
  using the identified metadata to determine desirable content.

The step of using the identified metadata to determine desirable content may comprise comparing the identified metadata with metadata associated with potential content to determine one or more items of the potential content most closely matching the identified metadata, as the desirable content.

The metadata may comprise a weighting of an importance of each property in the identified items of content.

The method may further comprise predicting a user population for the desirable content based on the metadata for the plurality of users.

The method may further comprise predicting a value for the desirable content based on the predicted user population.

The step of aggregating the metadata for a plurality of users may comprise segmenting the plurality of users into one or more groups and separately aggregating the metadata for each group.

The step of aggregating the metadata for a plurality of users may comprise segmenting the metadata into one or more groups and separately aggregating the metadata for each group; optionally wherein segmenting the metadata comprises segmenting based on one or more time periods in which the associated items of content were identified as a result of user activity.

The method may further comprise determining one or more languages of the selected items of content, segmenting the metadata into one or more groups based on the one or more languages and separately aggregating the metadata for each group.

The method may further comprise determining a popularity of the one or more languages amongst the plurality of users and aggregating the metadata for one or more of the most popular languages.

The potential content may comprise content available to buy and/or content proposals for making.

The method may further comprise generating the metadata associated with the potential content.

The method may further comprise ordering the desirable content from closest match to least closest match.

The method may carried out wherein one or more of:
  a. the monitoring of user activity is performed substantially continuously;
  b. the obtaining metadata concerning the identified items of content is performed at a first frequency;
  c. the aggregating the metadata for the plurality of users is performed at a second frequency;
  d. the using the aggregated metadata to identify one or more items or combinations of metadata popular with the plurality of users is performed at a third frequency; and
  e. the using the identified metadata to determine desirable content is performed at a forth frequency;
  wherein the first frequency is the same as or more frequent than the second frequency; the second frequency is the same as or more frequent than the third frequency; and the third frequency is the same as or more frequent than the fourth frequency.

The step of monitoring user activity may include monitoring user actions by the user of the user device, the user actions comprising one or more of: selecting, viewing, recording, purchasing, reading, listening to, playing, sharing, content rating, commenting on, downloading, watching, bookmarking, browsing, adding to a shopping basket, watching or listening to a trailer, clicking on a search result, remotely recording, setting a reminder, liking, disliking, tweeting, posting on social media, playing purchased content, stopping watching, stopping playing or otherwise interacting with content.

The metadata may comprise data relating to one or more of: actor; audience; award; category; character; character type; concept source; director; format; franchise; host; milieu; mood; producer; person; singer; subcategory; scenario; setting; sports competition; studio; style; subject; team; theme; time period; and writer.

The identified content and/or the desirable content may comprise one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

The method may comprise storing user activity and/or identified items of content and/or metadata associated with the identified items of content in user profiles in a first memory resource remote from the user devices.

The method may comprise storing the potential content and/or metadata associated with the potential content in one or more content memory resource.

In a further aspect, which may be provided independently, there is provided a system for determining desirable content for a content distribution system, the system comprising processing circuitry configured to:
for each of a plurality of user devices, monitor user activity including identifying content that the user of the user device has interacted with;
obtain metadata concerning the identified items of content, the metadata representing at least some properties of the identified items of content;
aggregate the metadata for a plurality of users;
use the aggregated metadata to identify one or more items or combinations of metadata popular with the plurality of users; and
use the identified metadata to determine desirable content.

In a further aspect, which may be provided independently, there is provided a computer program product (e.g. a non-transitory computer-readable medium) comprising computer-readable instructions that are executable to perform a method according to any clause or claim herein.

The content distribution system (or content provider system) may comprise at least one of a TV distribution system, a TV subscription service, a video-streaming system, a Video-on-Demand system.

The content distribution system has a plurality of users and may comprise at least 10,000 user devices, optionally at least 100,000 user devices, optionally at least 1,000,000 user devices.

The plurality of user devices may comprise at least one of a set top box, a television, a mobile device, a smartphone, a computer, a tablet, a game console or other device.

Reference to a user may include reference to a subscriber. A subscriber may have a plurality of users associated with it. For example, a subscription may be associated with a household and there may be a plurality of users, for example family members, associated with the subscription and who may, for example, interact with content.

The method may further comprise storing the desirable content in a database and/or outputting the desirable content via at least one of: a batch process, at least one e-mail, at least one short message service (SMS) message.

The method may comprise opening a content determination session prior to aggregating the metadata for the plurality of users.

The method may comprise retrieving user data for a plurality of users from a first storage resource, storing the user data in a second storage resource, and maintaining the user data in the first and/or second storage resource during the content determination session.

The method may comprise using the user data from the second storage resource and content information concerning potential content from one or more content sources to generate at least one desired content determination during the content determination session and providing the at least one desired content determination.

The providing of the at least one desired content determination may comprise providing the at least one desired content determination to an operator device of the content distribution system or to the plurality of user devices, either directly or indirectly. The at least one desired content determination may be provided to a further device, database and/or system that may process and/or send the at least one desired content determination to the plurality of user devices.

The first storage resource may comprise at least one of a remote storage resource and a less rapidly readable storage resource, and/or the second storage resource may comprise at least one of a local storage resource and a more rapidly readable storage resource.

The first storage resource may comprise a hard disk storage resource and the second storage resource may comprise random access memory (RAM).

The user data, for each user, may be stored in the first storage resource at substantially contiguous physical storage locations.

Storing the user data, for each user, at substantially contiguous physical locations may comprise storing the user data in a single sector of the first storage resource, or in a plurality of substantially contiguous sectors of the first storage resource.

The user data may be updated in one or more of the first storage resource and the second storage resource during the content determination session. For example, the user data in the second storage resource may represent a snapshot of the user data in the first storage resource at a beginning of the content determination session.

In some cases, the user data may be maintained in parallel in both the first and second storage resources, for example both in a hard disk resource in RAM.

The updating of the user data in the second storage resource may be performed in response to each new relevant user action, and the updating of the user data in the first storage resource may be performed at least one of:
a) in response to an expiry of the content determination session;
b) periodically;
c) in response to at least one of processing capacity or communication capacity being available.

The updating of the user data in the first storage resource may comprise copying of at least some of the data from the second storage resource to the first storage resource.

The updating of the user data in the first storage resource and the updating of the user data in the second storage resource may be both performed in response to each new relevant user action.

The updating of the user data for each user in the first storage resource may comprise storing the updated user data for the each user at substantially contiguous physical locations at the first storage resource.

The updated user data for each user may comprise new user data and pre-existing user data, and the storing of the updated user data for each user may comprise storing the new user data in the first storage resource at physical locations substantially contiguous with physical locations at which the pre-existing user data for each user is stored.

The pre-existing user data for each user may comprise user data for each user that was already stored in the first storage resource at the start of the content determination session.

The method may comprise deleting the user data for each user from the second storage resource in response to at least one of: expiry of the content determination session; the second storage resource being full or exceeding a threshold storage limit.

The user data may comprise user preference data based at least in part on user activity and, optionally, on at least one user preference selection by the user.

The user data may comprise at least one of: user action data representing previous user actions, optionally content selection, viewing or recording actions, user language data and/or episode data; content metadata representing properties of content viewed, recorded or selected by a user.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:

FIG. 2 is a representation of certain database learning tables used by the system of FIG. 1;

DETAILED DESCRIPTION

In TV systems, or other systems for provision of content to a user, each service provider may have thousands, tens or hundreds of thousands, or millions of customers, wherein each customer is unique and may have different viewing habits and preferences. It has therefore been recognized that each customer may require different content.

However, for any given content provider (also referred to as a content distributer) it is difficult to determine which content, out of potentially billions of available content, would be popular amongst their users. Furthermore, it is difficult to accurately forecast the number of likely viewers of new content and therefore it is difficult to determine the value or worth of the content to the content provider. In addition, content makers do not know with any certainty how popular the content they are making is going to be. It can therefore be difficult to determine which content to make with the funds available.

Tracking, recording and processing large volumes of customer data and large amounts of content data in order to determine what content may be popular, taking into account the time constraints demanded by a viewer and by the system poses a significant technical challenge. The time constraints demanded by particular content providers, or expected by users, for provision of content may be particularly demanding, with, for example, content recommendations being required to be generated almost instantaneously, for example within a few hundred milliseconds of a user switching on a set top box or otherwise beginning a viewing session. This can present a significant technical challenge, particularly as the content determination system is usually hosted on a server remote from the set top box and, for systems with millions of subscribers, may have to deal simultaneously with hundreds of thousands of user actions per minute during busy periods.

An ability to maintain anonymity of the users (e.g. to avoid issues in connection with the General Data Protection Regulation (GDPR) or similar) when providing determinations or recommendations and taking other actions, may be important in some embodiments.

The content provider system and/or the digital content determination system described herein may be configured so as to restrict or not allow access to personal information, or data that could be used to determine the name of a user, or demographic information concerning the user.

Figure 1:
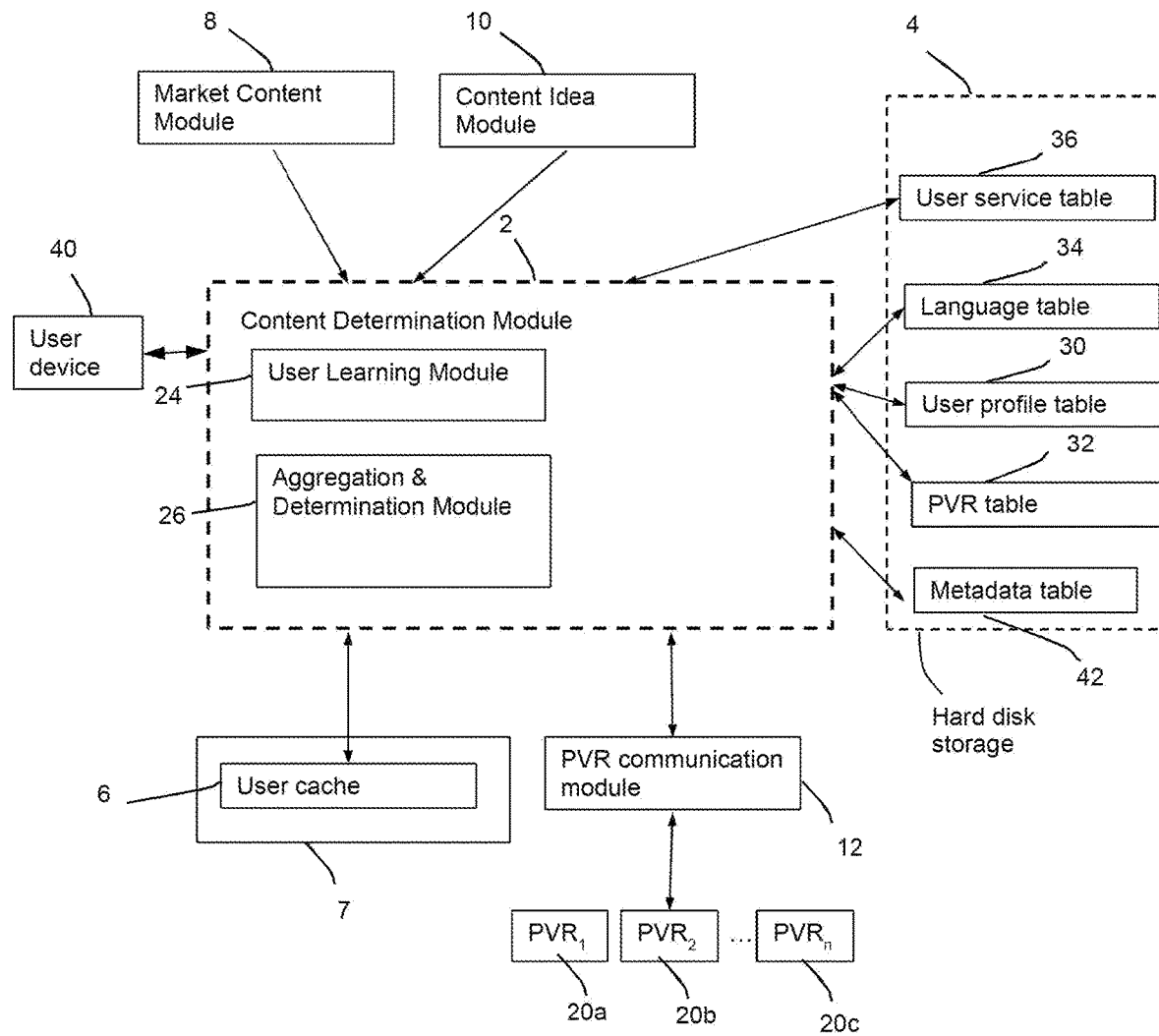
FIG. 1 is a schematic diagram of a digital content determination system.

FIG. 1 shows a schematic diagram of a digital content determination system according to an embodiment. The system is able to determine desirable content in a timely manner, based on real time or near real time monitoring of user actions for many thousands, tens of thousands or even hundreds of thousands or more users.

Example modes of operation are described below but desirable content may be determined in respect of any suitable users or user accounts, with the desirable content being created for or accessible via any suitable devices, for example set-top boxes, smartphones, personal computers (PCs) or tablets or any other suitable content delivery mechanism.

The system comprises a content determination module 2 linked to a first storage resource in the form of a hard disk storage device 4, which is used to store various user data. The content determination module 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a content determination session, as discussed in more detail below.

In the embodiment of FIG. 1, the content determination module 2 comprises a user learning module 24 and an aggregation and determination module 26.

The user learning module 24 is configured to monitor user activity including identifying content that the user of a user device 40 has interacted with, for each of the plurality of user devices 40. Optionally, the user learning module 24 may obtain metadata concerning the identified items of content, the metadata representing at least some properties of the identified items of content.

The aggregation and determination module 26 is configured for aggregating the metadata for a plurality of users, using the aggregated metadata to identify one or more items or combinations of metadata popular with the plurality of users, and using the identified metadata to determine desirable content.

As discussed further below, the content determination module 2 is able to communicate, either directly or indirectly, and either via wired or wireless connection, with very large numbers of users via user devices 40 and to provide recommendations for content derived from such users or user devices 40. Other than some personal video recorders (PVRs) which are shown schematically in FIG. 1, multiple user devices 40 are not shown in FIG. 1 for clarity. However, it will be understood that although a number n of PVRs (20*a*, 20*b*, 20*c*) are shown communicatively connected to the content determination module 2 via a PVR communication module 12, the PVRs may constitute or be comprised within user devices 40.

The content determination module 2 is also linked to sources of information concerning potential content, in this case a market content module 8 (e.g. comprising a listing or database of content available for purchase) and a content idea module 10 (e.g. comprising a listing or database of ideas for potential content yet to be made). In some embodiments, a variety of other sources of content may be available instead of or in addition to one or more of the market content module 8 and the content idea module 10, for example internet content and/or any suitable streamed content via wired or wireless connection.

In the embodiment of FIG. 1, the market content module 8, the content idea module 10, the content determination module 2, the user cache 6, the PVR communication module 12, the user learning module 24, and the aggregation and determination module 26 are implemented in a server. The server includes communication circuitry that enables communication between the server, or appropriate components of the server with each of the user devices 40, and with the content sources, for example a TV service operator or other content service operator.

Any other suitable implementation of the market content module 8, the content idea module 10, the content determination module 2, the user cache 6, the PVR communication module 12, the user learning module 24, and the aggregation and determination module 26 may be provided in alternative embodiments, for example they may be implemented in any software, hardware or any suitable combination or software and hardware. Furthermore, in other embodiments any one of the components as described in relation to the embodiment of FIG. 1 or other embodiments may be combined with any other one(s) of the components, or any one of the components may be split into multiple components providing the same or similar functionality.

The market content module 8 and/or the content idea module 10 may obtain content information concerning available or potential content from various content sources, for example a TV service operator or other content service operator, distributer or producer. The content information comprises metadata of content, for example, television program metadata. The metadata may be representative of a variety of different content parameters or properties, for example but not limited to program title, time, duration, content type, program categorization, actor names, genre, release date, episode number, series number. It is a feature of the embodiment that the metadata stored in or by the market content module 8 and/or the content idea module 10 may also be enriched with additional metadata, for example by the operator of the content determination system, such that additional metadata to that provided by the content sources or other external sources may be stored.

In the embodiment of FIG. 1 the content determination server, in particular the content determination module 2, communicates directly with each of the user devices 40, for example to monitor user activity, to identify content that the user of a user device 40 has interacted with, and to store user data relating to the identified content in the hard disk storage device 4. In some embodiments, the content determination module 2 communicates with the user devices 40 via the content sources or via other servers or devices. For example, in such other embodiments, user activity data may be sent to the content determination server via one of the content source servers or other server or device.

In the embodiment of FIG. 1 the system operates together with three sources of content available for a user device: real-time linear television, for example terrestrial or satellite broadcast television; one or more video-on-demand (VoD) services, and pre-recorded video content stored on one or more personal video recorders (PVR). In other embodiments further sources of content as well as or instead of the above may be used. The available content sources may be provided to the user devices 40 from a content provider.

The operation of the digital content determination system is controlled by the content determination module 2. As can be seen in FIG. 1, the content determination module 2 is configured to communicate with the one or more potential content information modules: the market content module 8 and the content idea module 10. The content determination module 2 is also configured to communicate with the user cache 6 local to the content determination module 2, the hard disk storage resource 4 and the one or more user devices 40 and PVRs. A data access layer (not shown) provides a communication interface between the content determination module 2 and the hard disk storage resource 4. The personal video recorder (PVR) communication module 12 provides a communication interface between the one or more PVRs 20*a*, 20*b*, . . . 20*n* and the content determination module 2.

The user learning module 24 receives data indicative of selections or other actions by a user and builds up a set of user data, for example comprising or representing a user history or profile, which is stored in the hard disk storage 4. Operation of the user learning module 24 is discussed in more detail below.

In accordance with FIG. 1, a user action is received by the content determination module 2 and the content determination module 2 is configured to log the user action as user activity. By logging user activity and storing user data over an extended period of time, the content determination module 2 and the hard disk storage 4 can build up an overall picture of the viewing activities, habits and preferences of a plurality of users. User actions are turned into learn actions by the user learning module 24.

The system of FIG. 1 is configured to operate with a plurality of user devices 40 each associated with at least one user. The plurality of user devices 40 may comprise a large number of devices, for example thousands, tens or hundreds of thousands, or even millions of devices. Each user device 40 may be any device or combination of devices that is configured to enable a user to view or otherwise consume content. For example, each user device 40 may be an internet-enabled device and/or a device for providing video or other content on demand and/or a device capable of receiving a real-time linear television broadcast signal. The user device 40 may be a mobile device, for example a tablet, a smart phone or a laptop. Alternatively, the user device 40 may not be mobile, for example, an internet browser enabled computing device, a smart television or a set-top box. The user device 40 may also have an in-built or associated PVR for recording and storing content in some embodiments.

The user may be a viewer of the user device 40. Alternatively or additionally, the user may be a subscriber and/or customer of a service accessible through the user device 40.

The user device 40 is communicatively coupled to the content determination module 2. The content determination module 2 has an application programming interface (the determination engine API) that provides a set of rules for monitoring user activity and carrying out a content determination procedure.

The user cache 6 is coupled to the content determination module 2 and is configured to store data for the content determination procedure. The content determination module 2 can access data stored on the user cache 6. The user cache 6 may be provided in random access memory (RAM) 7.

The hard disk storage 4 is communicatively coupled to the content determination module 2. The hard disk storage 4 stores data for use by the content determination module 2. The hard disk storage 4 is configured to store one or more databases. Entries from the databases on the hard disk storage resource 4 can be retrieved by the content determination module 2 via requests made through the data access layer. Entries in the databases may also be updated via the data access layer.

The database(s) at the hard disk storage 4 store user data that is used by the content determination module 2 to determine desirable content. In the embodiment of FIG. 1 a set of database tables is provided that store information concerning the users.

In the embodiment of FIG. 1, the tables may include at least one user service table 36 that represents user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables, for example, the user profile table 30, may include various user learning tables that include data representing for example the viewing activities, habits and preferences of each user. The user data can include data representing for examples explicit ratings given by a user to a particular program or other item of content. It is a feature of the embodiment of FIG. 1 that the user data also includes data representing actions, for instance viewing actions, taken by a user.

For example, if a user selects a program or other item of content and views or otherwise consumes it for greater than a threshold period of time then a learn action is generated and at least one user data item for that user is stored in at least one of the tables. The data item may include various data including for example start and stop viewing time, time slot identifier, program identifier, at least some metadata concerning the program (which may be stored in metadata table 42, although such metadata may be stored separately as content data rather than user data in some embodiments, and linked to or otherwise accessed if required, for example by the program name or other identifier). The user learning module 24 determines whether user data should be stored in the tables in respect of a particular user action or set of actions. For example, if a user only views a program for a very short period of time, for instance if they are channel surfing, then user data is not stored in the user learning tables in respect of that action. User data can be stored in respect of a variety of different user actions or events, for example selecting, viewing, recording or searching for content.

The learned language table 34 stores data relating to audio languages of content items that have been user actioned by the user.

The PVR table 32 stores data associated with content a user has recorded on their PVR.

In the embodiment of FIG. 1 it can be understood that a large part of the user data comprises user history or user action data that represent user actions over a significant period of time. The content determination module 2 can use such user data during a content determination procedure to determine desirable content recommendations.

In various embodiments, there is a limit to how long user data is kept or used. For example in the embodiment of FIG. 1 after a threshold period, for example six months or a year after being collected, items of user data may be deleted. Thus, in some embodiments the user data for a particular user may include only relatively recent user action data, although the amount of data may still be substantial.

In the embodiment of a FIG. 1, a distinction is made between different types of user and different sets of the tables may be stored for the different types of users.

It will be understood that requests (e.g. for user data) and results may be communicated between different parts of a network using one or more application program interfaces (APIs). The API defines the parameters and other data to be included in the request and the form and format of the results from the request.

FIG. 2 is a representation of certain database learning tables stored on the hard disk storage resource 4 of the embodiment of FIG. 1. The content determination module 2 supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favorite content item group information: content source (e.g. EPG or VOD) and unique identifiers for content item groups.

A subscriber may be a person who has subscribed to a particular service rather than the individual user who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) is stored. In that case, metadata and content recommendations, for example, may be based on attributes and/or user actions for a plurality of users associated with the same subscription, for example different members of the same household. The second is time-slot mode where content recommendations are generated in dependence on the particular time slot in question. For example user data generated for a particular time slot may be used selectively in generating metadata for a particular time slot (potentially with user data generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programs for certain time slots, for instance late afternoon time slots, making actions associated with children's programs more likely during those time slots.

Anonymous profiles may be used to recommend content, for example, when neither the individual customer nor subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, anonymous session tracking can be performed using cookies, wherein on a first request a cookie containing a unique identification is added and in later sessions used to identify the anonymous user. This works in a web environment. A cookie session profile holds a list of cookies that are known to the system together with data referring to when the cookie was created or last accessed by the content determination system.

For each user of all categories, the content determination system has separate groups of learning tables. In FIG. 2, the learning tables shown include "learned language", "content item ratings", "feature ratings" and "watched episodes". These tables are shown by way of example and other tables may be created such as "exclude content group". Other tables may also be stored in the embodiment of FIG. 1. Each user may have explicit preferences and implicit preferences. Explicit preferences are information the consumer tells the system by, for example, entering a questionnaire. Implicit preferences are information learned by the system through user actions. Data corresponding to user actions for the purpose of learning are stored in the learning tables.

The learned language table 34 stores data relating to audio languages of content items that have been user actioned by the user. For example, the table can store learned language information, the date at which the language was learned and an indication of whether or not the entry has been aged out.

The content item ratings table stores data representing properties of content such as the features, actors, channels. Feature ratings allows learn actions to specify properties of content information instead of the content item. A customer is capable of applying ratings to a content item. Rating information is stored in the customer feedback table (e.g. user profile table 30) and includes: time and date rating given; customer identifier; activity identifier; name and identifier of content item rated; content item group identifier if content item associated with a content item group; rating value; a scaled rating value to be used by the content determination module 2; feature ratings; content source ID; client type ID; series title of content tem and content item instance identifier. A flag is also stored to indicate if a recommendation has aged out or not. A feature rating made by a customer can also be stored on a specific list of features and/or sub-genres.

The watched episodes table stores data corresponding to a last actioned episode of a series as actioned by a user. For example, for each customer the episode history for the customer is stored. This includes a series identifier; a series title; a season and episode number, and the date and time the user action occurred.

The exclude content group table may store data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call center, set-top box). For content item groups, this information includes: customer identifier, time and date content item group excluded; content source; client type ID. In both cases, a flag is included that indicates whether or not the exclusion has been aged out.

In some embodiments, different data tables or combinations of data tables may be stored.

Although a particular system arrangement is shown in FIG. 1, there are various system arrangements that could be used.

Figure 3:
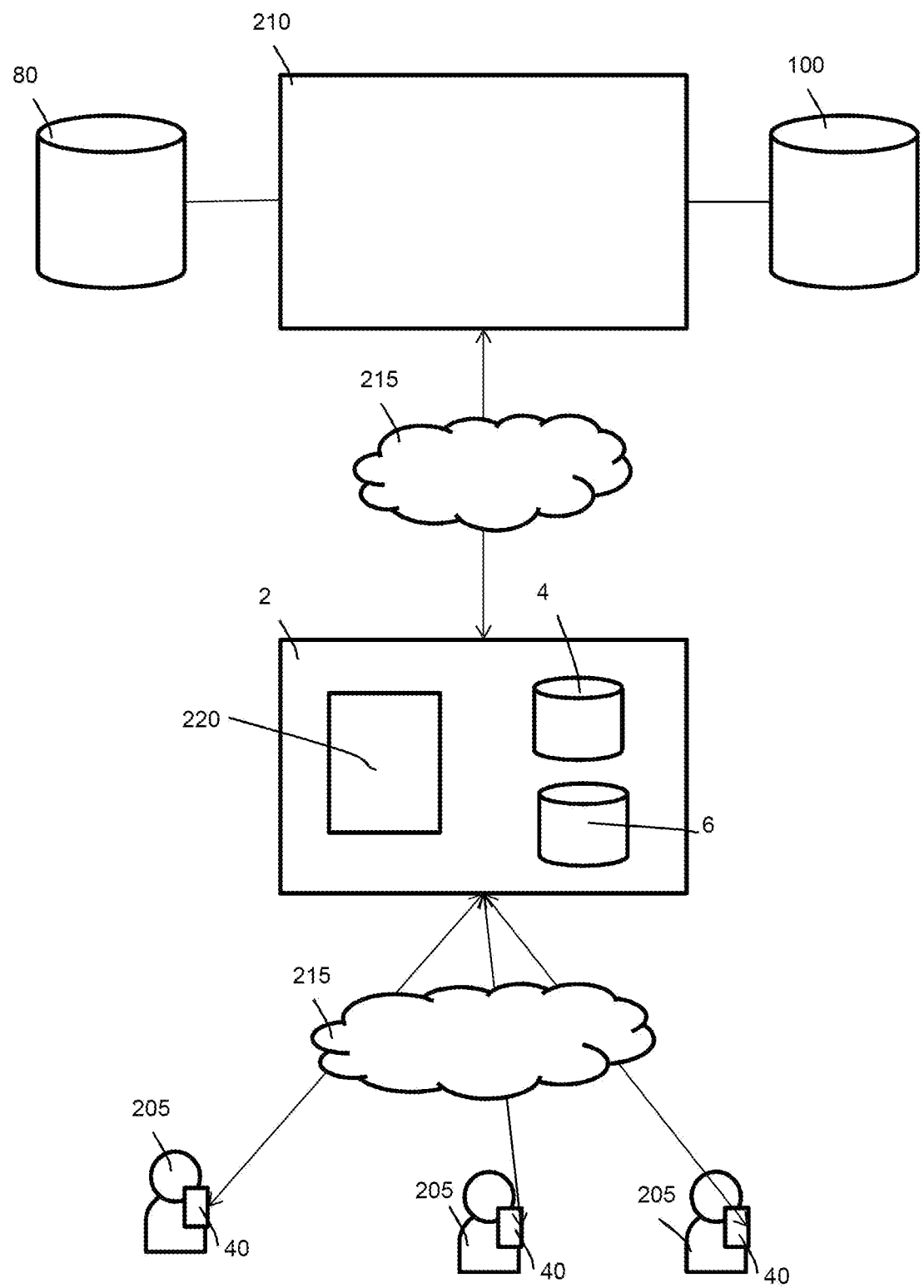
FIG. 3 is a simplified schematic of the system of FIG. 1.

FIG. 3 shows a "middleware" arrangement in which the content determination module 2 sits as "middleware" between users 205 and systems of a content provider 210. The content provider systems 210 are configured to provide a variety of content, e.g. real-time linear television 80 or VOD 100 to a plurality of users 205. The recommendation system 2 is implemented by processing resource 220 (which may comprise one or more processors) with the storage device 4 and user cache 6. In some examples, the content determination module 2 can be implemented by a cloud computing system, by one or more servers or other suitable enterprise level computing system. In this arrangement, systems that implement the content determination module 2 receive data sent from the user devices 40 of the users 205 that represents the user actions/user activity taken by the user 205 that are relevant to the content determination module, such as but not limited to actions taken by the user 205 to view or select content, including one or more of the user actions listed herein. The user devices 40 also provide a user ID that can be used to identify the user 205 to allow the provision of a content determination based on the user actions and preferences of a group of users 205. The user devices 40 communicate the data over a network, such as the cloud 215, to the content determination module 2. The content determination module 2 records the user actions in order to generate learn actions and build and update the user profiles that can be used together to make a content determination. The content determination module 2 can communicate requests and other data from the user devices 40 to the content provider systems 210 over a network, such as the cloud 215, in order to provide the content to the user devices 40.

Figure 4:
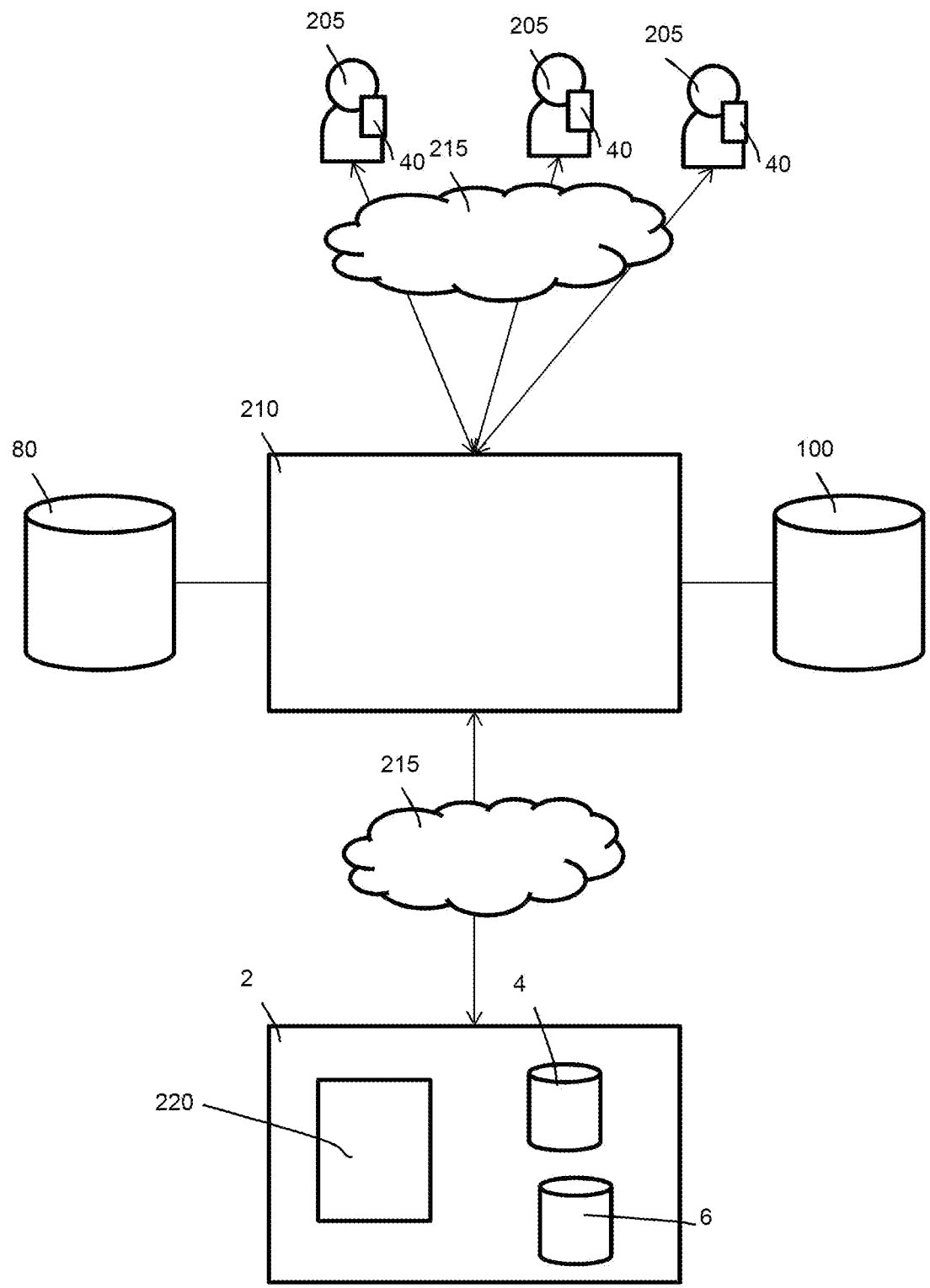
FIG. 4 is a simplified schematic of an alternative system arrangement to that of FIG. 3.

Other system arrangements that provide similar functionality to determine desirable content for a group of user are possible. FIG. 4 shows another system configuration in a "backend" processing arrangement. In this arrangement, the user devices 40 interface directly (over a network such as the cloud 215) with the systems of a content provider 210, which handles requests from and provides content to the user devices 40. User interaction data from the user devices 40 is provided by the systems of the content provider 210 to the content determination module 2 (e.g. over a network such as the cloud 215) in order for the content determination module 2 to identify learn actions and build user profiles for a plurality of users 205. The content determination module 2 gathers the data from the user profiles in order to determine desirable content for the user group.

Figure 5:
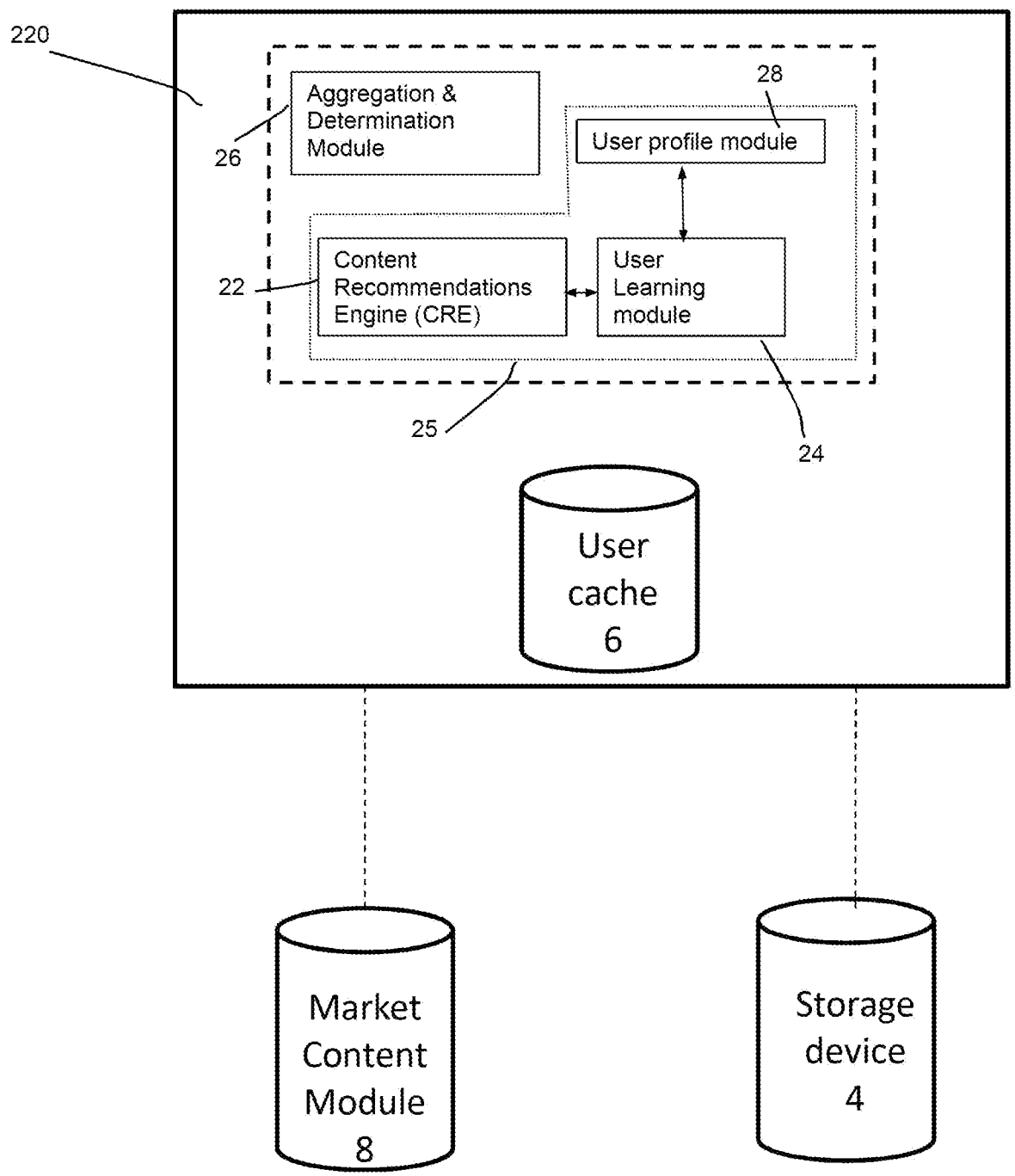
FIG. 5 is a schematic of a system for determining desirable content for a content distribution system.

FIG. 5 shows an arrangement of processing resource 220 for implementing the content determination module 2, including the user learning module 24 and the aggregation and determination module 26. In this embodiment, the user learning module 24 is part of a content recommendation system 25, which also includes a content recommendation engine (CRE) 22 and user profile module 28. However, in other embodiments, the user learning module 24 may be configured exclusively for use with the content determination module 2. The processing resource 220 can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the market content module 8, to retrieve content available for content providers to purchase. The processing resource 220 comprises rapid access storage, such as user cache 6, which may be implemented in RAM or SSD storage to provide fast access to user profiles and actions that the processing resource 220 is currently, and will next be, performing operations on. The processing resource 220 is also configured to communicate with external storage such as the storage device 4 on which user actions and profiles are stored and can be retrieved into the user cache 6 when needed by the processing resource 220. The aggregation and determination module 26 can be accessed by the operatives of the content determination system, which may include operators of the content provider systems 210 (or other suitable users) to determine desirable user content for the content provider. As part of this, the aggregation and determination module 26 can aggregate the metadata for a plurality of users, use the aggregated metadata to identify one or more items or combinations of metadata popular with the plurality of users, and use the identified metadata to determine desirable content, as will be described in more detail below.

The above description has been provided concerning the structure of the system of FIG. 1. Operation of the system of FIG. 1 to provide a content determination according to one mode of operation is now described with reference to the flowchart of FIG. 6.

Figure 6:
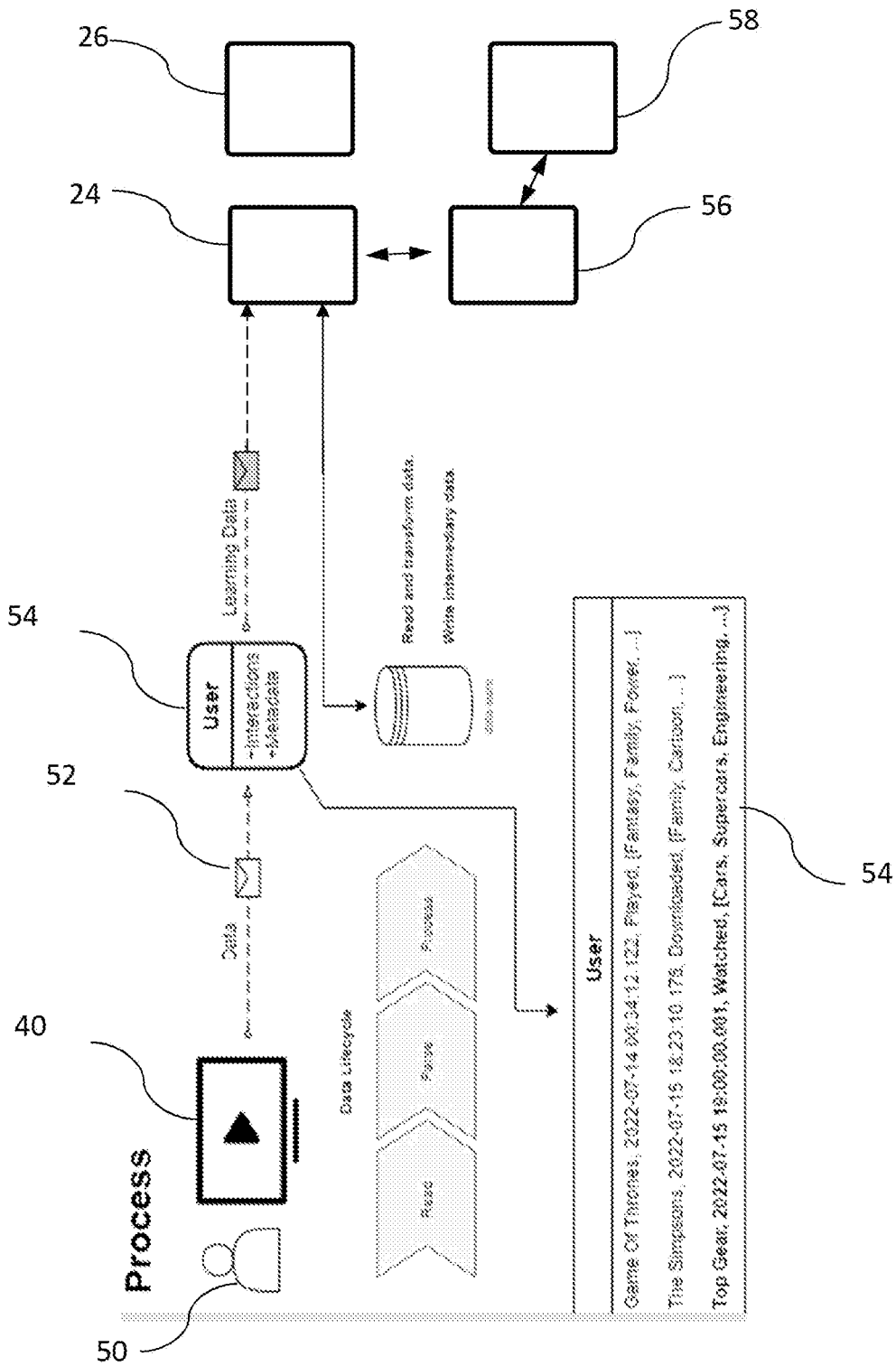
FIG. 6 is a schematic illustration of the generation of user records using the system of FIG. 1.

FIG. 6 illustrates schematically a process for generation of a desirable content determination using the system of FIG. 1. Only certain components of the system of FIG. 1 are included in FIG. 6, for clarity.

FIG. 6 shows a user 50 watching a television program that they have selected on user device 40. Data 52 representing the user's activity is sent to the user learning module 24 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record or user profile for the user.

A user record 54 for the user is illustrated schematically in FIG. 6. An expanded version of at least part of the user record is also shown in FIG. 6 for purposes of illustration. In this example, the user has performed actions in relation to three items of content. In particular, the user has played an episode of Game of Thrones on 14 Jul. 2022, has downloaded an episode of The Simpsons on 15 Jul. 2022, and has just watched an episode of Top Gear on 15 Jul. 2022. Some of the metadata associated with each item of content in the record is shown in FIG. 6. For example, at least the metadata items cars, supercars and engineering are associated with the Top Gear episode. In practice there will be many more items of metadata associated with each item of content.

In general, a user record 54 will include records of far larger numbers of items of content than shown for the purposes of illustration in FIG. 6. However, such a small number of items content might be found for a new user or for a temporary user of a system. For example in some embodiments, the system may be used for a user who is a guest in a hotel or traveler in a vehicle or transport system, and it is a feature of some embodiments that user profiles can be generated even for such temporary or short-term users.

Next, user data in respect of the user 50 is sent to the user learning module 24 in order to generate or update a user profile for the user 50.

In some modes of operation, the entire user record is sent to the user learning module 24 each time the user profile for the user is to be updated, and the user profile is regenerated based on the entire user record. In other modes of operation, only changes to the user record are sent to the user learning module 24, and then the user profile for the user is retrieved and updated based only on the changes to the user record (for example based on the user having watched one or more new items of content).

In the example shown in FIG. 6, for simplicity for the purposes of illustration, the user record sent to the user learning module 24 consists only of the record for the latest item of content viewed, in this case Top Gear.

In this example, the user record includes the metadata items 'cars', 'supercars', 'engineering' and 'talk-show'.

The user learning module 24 in this embodiment then performs a search of various data sources 56, for example in the cloud, to determine any other information concerning the item of content. For example, various databases can be consulted that include additional information concerning television programs or other items of content.

In the present embodiment, the record for the item of content and any other information found from the search of data sources 56 is subject to processing by sub-module 58 that matches the metadata and other information for the item of content to an ontology of metadata terms that are maintained by the system. Thus, the metadata for the item of content can be enriched, corrected or supplemented.

In some embodiments, the metadata includes features or properties of the item of content and a weighting for the importance of the feature in the item of content. For example, the metadata may comprise the name of an actor in the item of content and the weighting may represent the importance of the actor in the item of content—for example a high weighting would be given to a lead actor while a low weighting would be given to an actor playing a minor role. In another example, the metadata may comprise a mood (e.g. happy, sad, dark, spooky) associated with the item of content and the weighting may represent the dominance of the mood in the item of content.

In the present embodiment the ontology consists of around 38,000 terms that can be used as metadata to represent items of content, for deep content understanding. Any other suitable ontology can be used in other embodiments. In some embodiments, no ontology is used and the raw metadata associated with the item of content (for example, provided by the content maker, distributor or broadcaster) is used without amendment or enrichment.

The metadata (and optionally its weighting) for the item of content is stored in the user record in the hard disk storage 4.

When a content determination session is required, for example, when a request to determine desirable content for a user group is received by the content determination module 2 from an operator device, the aggregation and determination module 26 retrieves as inputs, for example, via the user cache 6, the (anonymized) metadata for a plurality of users from the storage device 4 and the metadata associated with potential content from, for example, the market content module 8.

The aggregation and determination module 26 then uses these inputs to aggregate the metadata for a plurality of users to identify one or more items or combinations of metadata popular with the plurality of users, and to use the identified metadata to determine desirable content. These steps may be performed in a number of ways.

Figure 7:
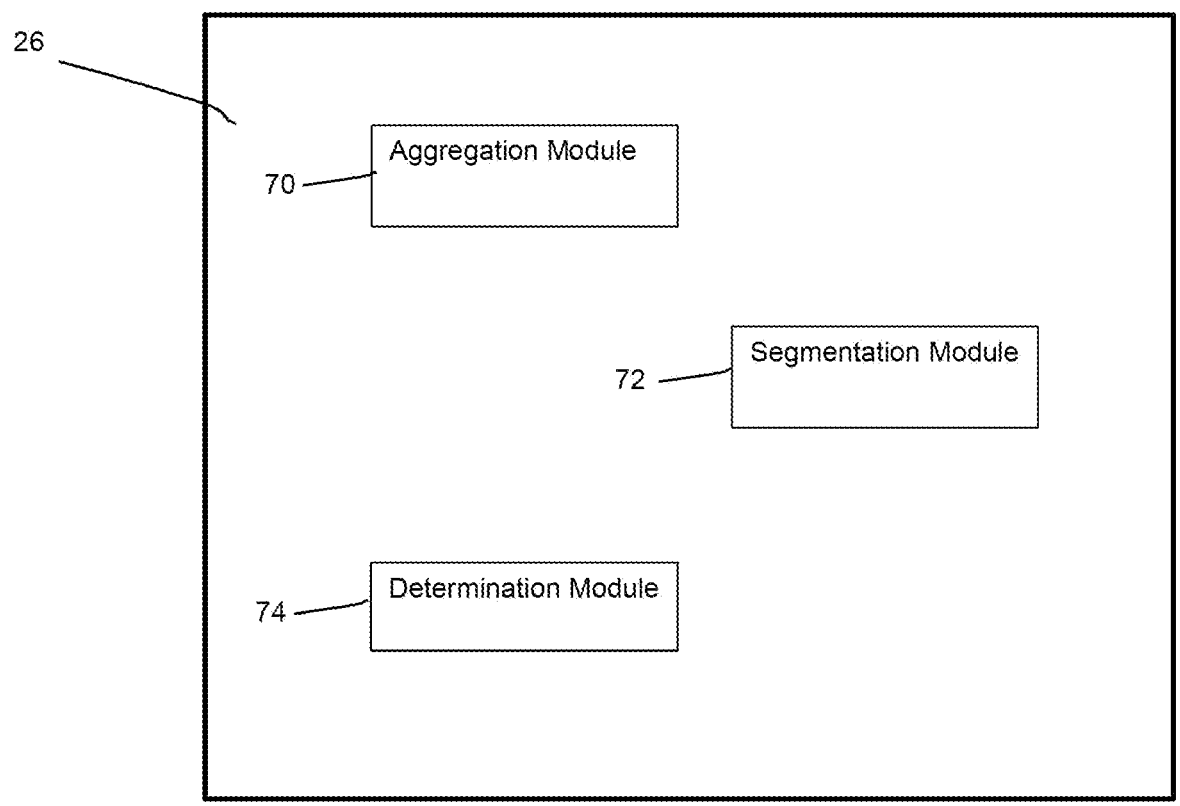
FIG. 7 is simplified schematic of an aggregation and determination module.

For example, as shown in FIG. 7, the aggregation and determination module 26 may be comprised of three components, functional elements or procedures. These may include an aggregation module 70, a segmentation module 72 and a determination module 74. Any or all of the aggregation module 70, the segmentation module 72 and the determination module 74 may be combined in different embodiments. In some embodiments, the segmentation module 72 may be omitted.

The aggregation module 70 may be configured to aggregate the metadata for a plurality of users. This may comprise, for example, adding together the weighting of the metadata for common features across a plurality of user profiles using the user data in the user cache 6.

The determination module 74 may comprise a trained machine learning model, which is trained to take as inputs the weighting of the metadata for common features, from the aggregation module 70, along with the metadata associated with the potential content and to generate an output of the best matching potential content as the most desirable content based on the metadata. The most desirable content may comprise a single item of content or, for example, tens or hundreds of items of the most desirable content. The output may be relayed to an operator of the content provider system.

In the present embodiment, a thresholding process is performed on the output of the process such that desired content with a low match to the input metadata is omitted from being provided to the requesting operating device.

In some embodiments, the aggregation and determination module 26 may take as an input the metadata for the plurality of users and the metadata associated with the potential content and may output the desirable content, without requiring a prior aggregation step. In other words, the aggregation and determination module 26 may comprise a trained machine learning model that is trained to both aggregate the metadata for the plurality of users to identify one or more items or combinations of metadata popular with the plurality of users, and to use the identified metadata to determine desirable content.

The segmentation module 72 may be configured to segment the plurality of users into one or more groups and to provide the metadata for one of the groups at a time, to the aggregation module 70 such that the aggregation of the metadata is performed separately for each user group. For example, the segmentation module 72 may be configured to segment the plurality of users into different categories such as children, teenagers or adults.

In some embodiments, the segmentation module 72 may be configured to segment the metadata into one or more groups and to provide the metadata for one of the groups at a time, to the aggregation module 70 such that the aggregation of the metadata is performed separately for each metadata group (e.g. home improvement or talk show). For example, the segmentation module 72 may be configured to segment the metadata based on one or more time periods (e.g. daytime or prime-time) in which the associated items of content were identified as a result of user activity.

In some embodiments, the segmentation module 72 may be configured to segment the metadata into one or more groups based on one or more languages of the associated content and to provide the metadata for one of the groups at a time, to the aggregation module 70 such that the aggregation of the metadata is performed separately for each language group. In this case, the segmentation module 72 may determine a popularity of the one or more languages amongst the plurality of users and may relay for aggregation the metadata for one or more of the most popular languages.

The segmenting of the users or metadata may be performed prior to aggregation of the metadata to limit the amount of data to be aggregated for any given group. However, in some embodiments, the segmentation may be performed after the aggregation of the metadata and prior to the determination of the desired content. In some embodiments, no segmentation may be performed. In some embodiments, segmentation may be performed on the desired content, for example, to group the desired content by user group, metadata, language etc.

Any suitable trained machine learning model may be used. For example, a clustering model may be used which may comprise a Kohenen neural network or KMeans clustering technique to cluster the dataset into distinct groups, which are unknown to begin with.

In some embodiments, the trained model or other process is applied directly to the metadata without also enriching or mapping to or otherwise using the ontology. In some embodiments more than one trained model is used, for example one or more trained models to enrich or modify metadata associated with potential items of content based on the ontology or other further data set, and one or more models to determine the desirable content based on the user profiles.

In some embodiments, the model may assign scores to each of the items of potential content based on how closely the content metadata matches that of the user group.

The resulting desired content can be used to predict a population or audience size for the content. For example, the content determination module 2 may be configured to calculate a number of users that may be interested in each of the desired items of content based on the user profiles.

It may be possible to use the potential audience size to calculate or assign a value to the desired content, which can be used in negotiating a price for the content.

This approach allows for more accurate and effective technique for identifying content that users may like and for predicting an audience size and associated value of the content prior to purchasing or even making the content. As such, content providers can focus on purchasing and commissioning content that their users are likely to enjoy.

Figure 8:
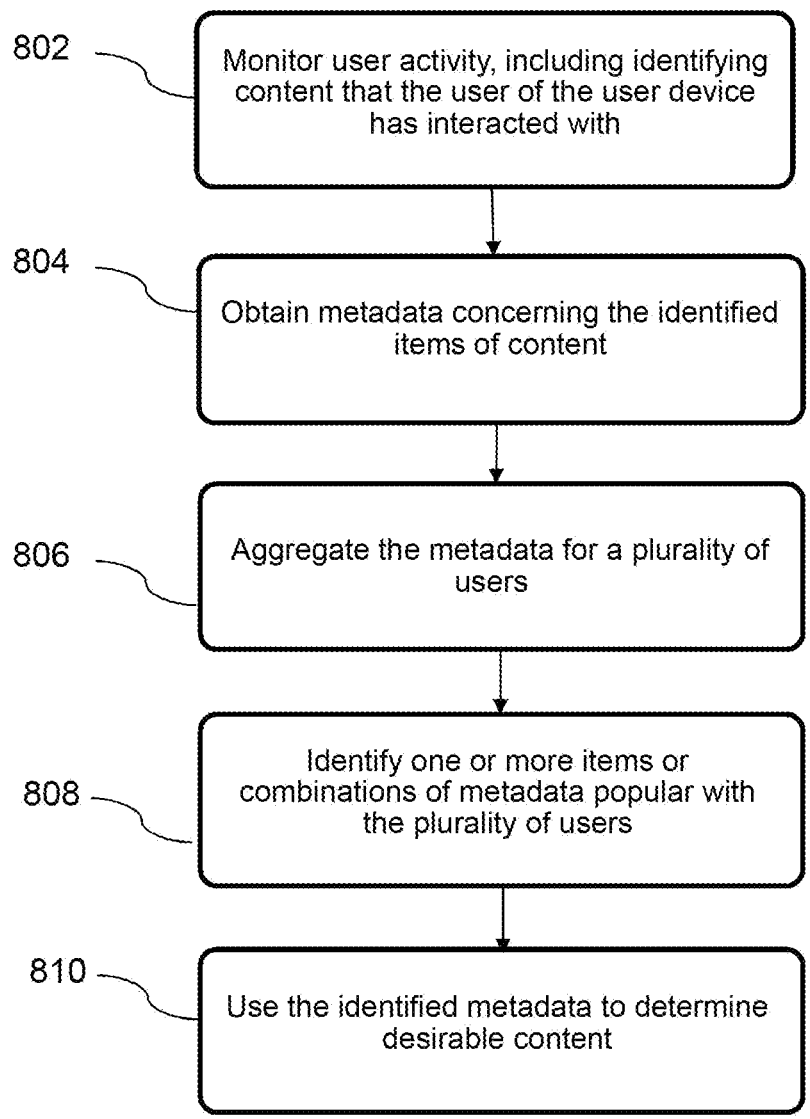
FIG. 8 is an overview of a method of determining desirable content for a content distribution system in accordance with an embodiment.

FIG. 8 is an overview of a method of determining desirable content for a content distribution system, such as that described above, in accordance with an embodiment.

In general, the method comprises, for each of a plurality of user devices 40, monitoring user activity including identifying content that the user of the user device 40 has interacted with in first step 802 and obtaining metadata concerning the identified items of content in a second step 804. As explained previously, the metadata represents at least some properties of the identified items of content. The method comprises a step 806 of aggregating the metadata for a plurality of users. In a step 808, the method comprises using the aggregated metadata to identify one or more items or combinations of metadata popular with the plurality of users and, in a step 810, the method comprises using the identified metadata to determine desirable content.

The steps 802 and, optionally, 804 may be performed substantially continuously and the user activity may be added to the user profile for a variety of uses, not just for determining desirable content to purchase or make according to the present disclosure.

However, the remaining steps in the method of FIG. 8 may only be carried when it is desired to determine content to purchase or make. For example, the complete method may be carried out when new content is available (e.g. when the rights to a televised sports fixture are available or are to become available). In some embodiments, the method may be carried out on a regular or semi-regular basis to spot trends in user viewing patterns and to support or influence either short or long term content purchasing or making decisions.

A request for content determination may be received by the content determination module 2, for example, from an operator device. In some embodiments, the content determination module 2 may be configured to carry out a content determination procedure according to a schedule. For example, the schedule may be arranged to carry out the content determination procedure daily, weekly, monthly or annually. In some embodiments, the content determination procedure may be different depending on whether it is scheduled to be conducted daily, weekly, monthly or annually. For example, for a daily or weekly content determination procedure, the user profile data may be filtered so that only content interacted with by the user in the past day or week is considered to allow identification of any hot topics for content. In some embodiments, for a monthly or annual content determination procedure, the user profile data may be filtered so that content interacted with by the user in the past one month or longer is considered to allow identification of any longer term trends for content. In some cases, user actions for a similar time, day, week, month or season may be selected for use in the content determination procedure.

The step 802 of monitoring user activity includes monitoring user actions by the user of the user device 40, wherein the user actions may comprise one or more of: selecting, viewing, recording, purchasing, reading, listening to, playing, sharing, content rating, commenting on, downloading, watching, bookmarking, browsing, adding to a shopping basket, watching or listening to a trailer, clicking on a search result, remotely recording, setting a reminder, liking, disliking, tweeting, posting on social media, playing purchased content, stopping watching, stopping playing or otherwise interacting with content.

A learn action may be based on an indication that a user has watched a content item for a specified period of time. The information may be used as an indication of user preferences and potentially to provide more accurate determinations for desirable content in the future. A minimum event time filter may be implemented to ensure that short period events are not sent to the user learn module 24. In this case, a learn action is only generated if an event exceeds the minimum event time filter. In addition, there may be a rule that only one learn action for each content item should be generated. For example, a viewer may watch a program and switch channels during an advert break and then return to the original program. In such an event, only one learn action may be generated according to some embodiments.

New user data, for example new table entries, corresponding to the learn actions for the user ultimately are stored in the hard disk storage 4. However, it is a feature of some embodiments that user data for the user stored in RAM 7 during a content determination session is updated, based on the learn actions for the user occurring during the content determination session, on an ongoing basis. Thus, the user data for a user stored in RAM 7 may change during a content determination session, such that the content determinations are based on the most up-to-date user data.

In the present embodiment, the user data for a user is overwritten by the user data stored in RAM 7 (which may be more up-to-date) in response to the end of a content determination session. For example, the updated user data can be provided to the hard disk resource 4 in response to an expiry event. For example, an expiry event may occur a predetermined period of time after a start of a content determination session.

In some embodiments, all of the user data for the users stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available.

Higher priority may be given to updating the user data in RAM 7 than to updating the user data in the hard disk storage 4.

In some embodiments, the user data for a user may be maintained in RAM 7 after the end of a content determination session and only deleted from RAM 7 in response to the user data from RAM 7 having been written to the hard disk storage 4.

Details of the user activity and at least a content identifier for the content interacted with are stored in the user profile on the hard disk storage 4. The content identifier is used to obtain metadata associated with the content. The metadata may be stored on a content database accessible by the user learning module 24. The metadata may be obtained either on detection of a user activity concerning the content or at a time thereafter. For example, the user learning module 24 may be configured to obtain metadata for a plurality of content identifiers during a scheduled batch run or when the metadata for a particular content item is required. For example, when a content determination procedure is initiated (by a request or scheduled procedure), the user learning module 24 may be instructed to obtain metadata for a plurality of content identifiers stored in a plurality of user profiles.

The metadata may comprise data relating to one or more of: actor; audience; award; category; character; character type; concept source; director; format; franchise; host; milieu; mood; producer; person; singer; subcategory; scenario; setting; sports competition; studio; style; subject; team; theme; time period; and writer or other property associated with content. The metadata may comprise a weighting of an importance of each property in the associated items of content.

In some embodiments, the metadata associated with the identified items of content may be stored in the user profiles, for example in the metadata table 42 on the hard disk storage 4, which is remote from the user devices 40.

The method may further comprise obtaining and/or generating the (enhanced) metadata associated with the potential content for purchase or making. In this case, the system may create and/or maintain one or more databases of metadata associated with the potential content, which may be accessible via the market content module 8 and/or content idea module 10. In some embodiments, the metadata associated with the potential content may be stored in RAM 7. The content metadata stored in RAM 7 may be updated periodically or in response to changes in the data stored. By caching the content metadata in RAM processing and data access speed may be increased.

The content (e.g. the identified content that the user interacts with and/or the desirable content) may comprise one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

The metadata associated with content items may include constant information including: a unique identifier; duration of the content item; the certificate of the content item e.g. the age rating; the year the content item was released; the critic rating for the content item; the original audio language for the content item; the season and episode numbers; series title information and/or identifier; content item description, and a primary language to be used by a content recommendations engine when checking for previously recommended items. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

In the present embodiment determinations of desirable items of content may be provided based on data concerning items of content of the same type (for example video content, such as movies, TV programs or other video content), and/or based on user data representing previous consumption of, or actions relating to, content of the same type (for example video content, such as movies, TV programs or other video content). It will be understood that video content may include associated audio content, for example an associated soundtrack.

In other embodiments, desired content determinations are generated for content items of one type based on content information or user actions concerning content of another type. The different types of content may comprise, but are not limited to, video content (for example, movies, TV programs or other video content), audio content (for example, music, podcasts, talking books), computer games, books, magazines, other printed content, live performances such as concerts, plays, comedy performances or sporting events.

In some embodiments, the content determinations based on user actions or preferences concerning content of one type may comprise determinations of more than one type of desirable content. For example, a content determination may be based on user actions or preferences in relation to TV programs, but the content determination may comprise one or more TV programs and, in addition, one or more items of another type of content.

Although the system of the present embodiment includes hard disk storage 4 and RAM 7, any suitable other memory devices or types of storage may be used as well as or instead of the hard disk storage 4 and/or RAM 7 in other embodiments.

The step 806 of the aggregating the metadata for the plurality of users may be performed when required or according to a schedule. The step 808 of using the aggregated metadata to identify one or more items or combinations of metadata popular with the plurality of users may be performed when required or according to a schedule and the step 810 of using the identified metadata to determine desirable content may be performed when required or according to a schedule, as explained above.

The step 810 of using the identified metadata to determine desirable content may comprise comparing the identified metadata with metadata associated with potential content to determine one or more items of the potential content most closely matching the identified metadata as the desirable content. The desirable content may be ordered from closest match to least closest match.

The method may return a list of which content would be recommended to each user or user group, if that content was available for distribution by the content provider. For example, a list of the top 10 titles may be provided as being the ones that the system determines that the customer base will be interested in. This gives the content provider powerful information when negotiating rights for new titles as well as which long tail titles to purchase. For example, a content provider may wish to purchase more comedy programs but may not know which to buy to appeal to the most users and the present system and method will help to identify the content most likely to appeal to its users.

An important technical consideration concerns the amount of data that the system and method need to contend with. For example, there may be 50 million users and user profiles associated with a given content provider, billions of content items and billions of data points (e.g. relating to the metadata). Accordingly, the system must be configured to handle such huge volumes of data in an efficient and yet accurate manner in order to provide useful results.

As described herein, the system and method of the present disclosure can be used advantageously to predict the metadata qualities users seek to inform development, and licensing of content. In other words, the system and method can be used to forecast what kind of content an operator/provider should purchase or make in order to retain users and drive more content consumption (e.g. viewing).

The above description of specific embodiments is made by way of example only. A skilled person will appreciate that variations of the described embodiments may be made without departing from the scope of the invention.

The invention claimed is:

1. A computer-implemented method for determining desirable content for a content distribution system to make or buy, comprising:

for each of a plurality of user devices, monitoring user activity including identifying content that the user of the user device has interacted with;

obtaining metadata concerning the identified items of content that the user of the user device has interacted with, the metadata representing at least some properties of the identified items of content, wherein the metadata comprises a weighting of an importance of each property in the identified items of content that the user of the user device has interacted with;

aggregating the metadata for a plurality of users by adding together the weighting of the metadata for common properties of identified items of content that the user of the user device has interacted with;

using the aggregated metadata to identify one or more properties or combinations of properties popular with the plurality of users; and using the identified one or more properties or combinations of properties popular with the plurality of users to determine desirable content to make or buy.

2. The computer-implemented method of claim 1 wherein using the identified properties to determine desirable content comprises comparing the identified properties with properties associated with potential content to determine one or more items of the potential content most closely matching the identified properties as the desirable content.

3. The computer-implemented method of claim 1 further comprising predicting a user population for the desirable content based on the metadata for the plurality of users.

4. The computer-implemented method of claim 1 further comprising predicting a value for the desirable content based on the predicted user population.

5. The computer-implemented method of claim 1 wherein the step of aggregating the metadata for a plurality of users comprises segmenting the plurality of users into one or more groups and separately aggregating the metadata for each group.

6. The computer-implemented method of claim 1 wherein the step of aggregating the metadata for a plurality of users comprises segmenting the metadata into one or more groups and separately aggregating the metadata for each group; optionally wherein segmenting the metadata comprises segmenting based on one or more time periods in which the associated items of content were identified as a result of user activity.

7. The computer-implemented method of claim 1 further comprising determining one or more languages of the selected items of content, segmenting the metadata into one or more groups based on the one or more languages and separately aggregating the metadata for each group.

8. The computer-implemented method of claim 6 further comprising determining a popularity of the one or more languages amongst the plurality of users and aggregating the metadata for one or more of the most popular languages.

9. The computer-implemented method of claim 2 further comprising generating the metadata associated with the potential content.

10. The computer-implemented method of claim 2 further comprising ordering the desirable content from closest match to least closest match.

11. The computer-implemented method of claim 1 wherein one or more of:
a. the monitoring of user activity is performed continuously;
b. the obtaining metadata concerning the identified items of content is performed at a first frequency;
c. the aggregating the metadata for the plurality of users is performed at a second frequency;
d. the using the aggregated metadata to identify one or more properties or combinations of properties popular with the plurality of users is performed at a third frequency; and
e. the using the identified one or more properties or combinations of properties popular with the plurality of users to determine desirable content is performed at a fourth frequency;
wherein the first frequency is the same as or more frequent than the second frequency; the second frequency is the same as or more frequent than the third frequency; and the third frequency is the same as or more frequent than the fourth frequency.

12. The computer-implemented method of claim 1 wherein monitoring user activity includes monitoring user actions by the user of the user device, the user actions comprising one or more of: selecting, viewing, recording, purchasing, reading, listening to, playing, sharing, content rating, commenting on, downloading, watching, bookmarking, browsing, adding to a shopping basket, watching or listening to a trailer, clicking on a search result, remotely recording, setting a reminder, liking, disliking, tweeting, posting on social media, playing purchased content, stopping watching, stopping playing or otherwise interacting with content.

13. The computer-implemented method of claim 1 wherein the metadata comprises data relating to one or more of the following types of properties: actor; audience; award; category; character; character type; concept source; director; format; franchise; host; milieu; mood; producer; person; singer; subcategory; scenario; setting; sports competition; studio; style; subject; team; theme; time period; and writer.

14. The computer-implemented method of claim 1 wherein the identified content and/or the desirable content comprises one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

15. The computer-implemented method of claim 1 comprising storing user activity and/or identified items of content and/or metadata associated with the identified items of content in user profiles in a first memory resource remote from the user devices.

16. The computer-implemented method of claim 2 comprising storing the potential content and/or metadata associated with the potential content in one or more content memory resource.

17. A system for determining desirable content for a content distribution system to make or buy, the system comprising processing circuitry configured to:
for each of a plurality of user devices, monitor user activity including identifying content that the user of the user device has interacted with;
obtain metadata concerning the identified items of content, the metadata representing at least some properties of the identified items of content that the user of the user device has interacted with, wherein the metadata comprises a weighting of an importance of each property in the identified items of content that the user of the user device has interacted with;
aggregate the metadata for a plurality of users by adding together the weighting of the metadata for common properties of identified items of content that the user of the user device has interacted with;

use the aggregated metadata to identify one or more properties or combinations of properties popular with the plurality of users; and use the identified one or more properties or combinations of properties popular with the plurality of users to determine desirable content to make or buy.

18. A non-transitory computer-readable medium that comprises computer-readable instructions that are executable to perform a method for determining desirable content for a content distribution system to make or buy, the method comprising:

for each of a plurality of user devices, monitoring user activity including identifying content that the user of the user device has interacted with;

obtaining metadata concerning the identified items of content, the metadata representing at least some properties of the identified items of content that the user of the user device has interacted with, wherein the metadata comprises a weighting of an importance of each property in the identified items of content that the user of the user device has interacted with;

aggregating the metadata for a plurality of users by adding together the weighting of the metadata for common properties of identified items of content that the user of the user device has interacted with;

using the aggregated metadata to identify one or more properties or combinations of properties popular with the plurality of users; and using the identified one or more properties or combinations of properties popular with the plurality of users to determine desirable content to make or buy.

* * * * *